Figure 5:
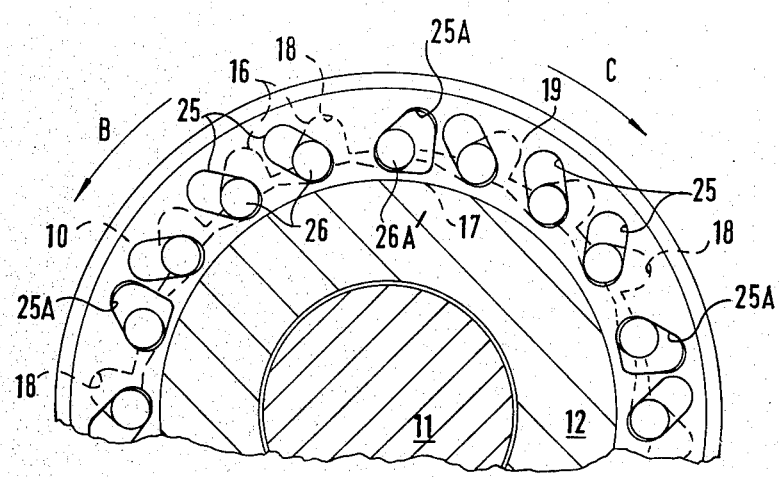

United States Patent [19]

Brownett

[11] 4,350,235

[45] Sep. 21, 1982

[54] ANTI-REVERSAL DEVICE

[75] Inventor: Robert L. Brownett, Leicester, England

[73] Assignee: Dunlop Limited, London, England

[21] Appl. No.: 112,219

[22] Filed: Jan. 15, 1980

[30] Foreign Application Priority Data

Jan. 27, 1979 [GB] United Kingdom ............... 7902969

[51] Int. Cl.³ .................... F16D 15/00; F16D 41/06
[52] U.S. Cl. ................................. 192/45; 188/82.84; 192/46
[58] Field of Search ........................... 192/45, 46, 71; 188/82.1, 82.8, 82.84

[56] References Cited

U.S. PATENT DOCUMENTS

| 1,443,248 | 1/1923 | Defordt ................................. 192/45 |
| 1,817,660 | 8/1931 | Winther et al. .................. 192/46 X |
| 2,232,090 | 2/1941 | Anderson ............................. 192/45 |
| 3,406,797 | 10/1968 | Toussaint .......................... 192/45 X |

FOREIGN PATENT DOCUMENTS

| 984048 | 5/1951 | France . |
| 2139341 | 2/1977 | France . |
| 343794 | 3/1931 | United Kingdom . |
| 435099 | 1/1935 | United Kingdom . |
| 435148 | 1/1935 | United Kingdom . |
| 473040 | 3/1936 | United Kingdom . |
| 493811 | 11/1938 | United Kingdom . |
| 1129235 | 10/1969 | United Kingdom . |
| 1511704 | 4/1978 | United Kingdom . |
| 1541718 | 4/1978 | United Kingdom . |

Primary Examiner—Rodney H. Bonck
Attorney, Agent, or Firm—Stevens, Davis, Miller & Mosher

[57] ABSTRACT

An anti-reversal device is provided whereby a wheel and shaft are free to rotate in one sense (B) relative to a stationary member but are prevented from counter-rotating in the sense (C) by engagement of load-bearing pins between teeth of the respective members. The pins are positively driven to the operative positions in which they are shown by a control ring which is free to rotate with the wheel in the permitted sense (B) but prevented from rotating in the other sense (C) by the engagement of secondary pins between teeth on the inner periphery of the control ring and secondary teeth on the stationary member. If the wheel tends to counter-rotate in the sense (C) the teeth of the wheel drive the pins down the slots in the arrested control ring to their operative positions. When rotation of the wheel recommences in the permitted sense (B) the tendency of the control ring to lag behind causes the pins to be displaced to the radially outer ends of the slots so that there is no friction between the pins and the teeth of the stationary member.

In a modification the secondary pins, the secondary teeth on the stationary member and the recesses in the inner periphery of the control ring are dispensed with and their functions are performed by additional pins between the teeth and located in slots in the control ring which have an opposite inclination to the remaining slots.

15 Claims, 6 Drawing Figures

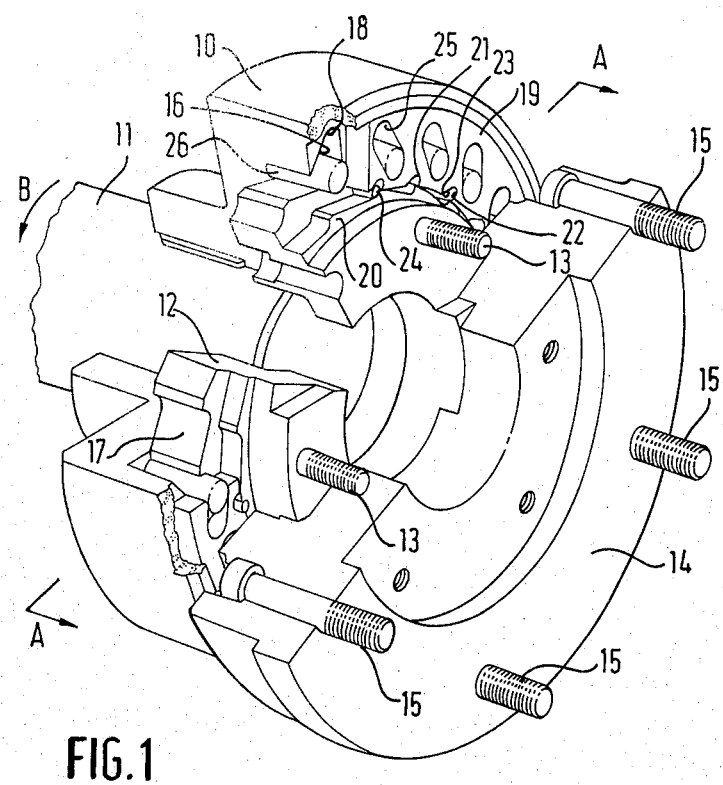
FIG. 1
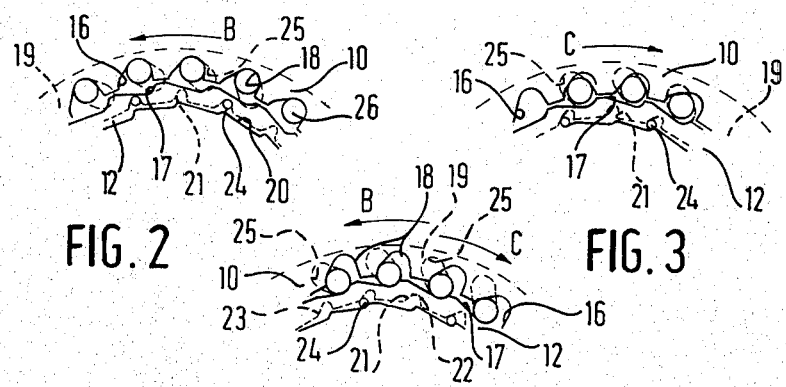
FIG. 2  FIG. 3
FIG. 4

ANTI-REVERSAL DEVICE

The present invention relates to an anti-reversal device for preventing counter-rotation between two members having concentric rings of teeth and pins located between the rings of teeth, the pins being displaceable between operative positions in which they are in abutment between teeth of the respective members to prevent relative rotation in one sense of said members and inoperative positions in which said pins are clear of the teeth of one of said members so that said members are freely relatively rotatable in the other sense without friction between said pins and the teeth of said one member.

It is frequently desirable in machinery to provide means whereby a member rotating in a bearing in another member should be capable of rotating in one sense only and should be incapable of counter rotation. The simplest known form of such a device is a pivotal pawl which runs on ratchet teeth on a rotating shaft or wheel. There are two reasons why such devices are unsuitable for applications where the rotating member can be expected to rotate at high speed or where it will be subject to heavy load. Any increase in the size of the ratchet teeth enabling them to make a more positive engagement with the pawl will reduce their number and consequently increase the interval between two successive teeth. This interval represents the permitted run-back of the device before the pawl engages a tooth and the greater the permitted run-back the greater the kinetic energy which will be developed before the pawl engages and consequently the greater the shock to the assembly. Not only must the ratchet and pawl be strongly enough built to withstand such shocks, but because of its pivoted, lever arm arrangement the pawl has a tendency to swing out of engagement with the tooth under the influence of such shocks. In the case of heavily loaded apparatus which will quickly gather momentum if the pawl misses or fails to engage the first tooth its impact with a second tooth may be greater than the assembly can withstand. In such arrangements the only way to reduce "run-back" is to diminish the angular interval between successive teeth, but this necessarily reduces the size of the abutment faces of the teeth so that each is less capable of positive engagement with the pawl.

The other principal drawback of a ratchet and pawl arrangement is that the pawl constantly rides on the ratchet teeth while the permitted rotation is taking place. At high speed running friction generates heat which in turn can create a combustible situation in a dust laden atmosphere, for example in mining environments where the dust is of an ignitable nature. Also the ingress of dirt into the associated bearings may quickly impede the free pivotal movement of the pawl so that it fails reliably to engage the teeth and may become fixed in an inoperative position. In such applications failure of the pawl reliably to engage the first tooth it encounters immediately counter rotation takes place has serious consequences because of the kinetic energy developed before the next tooth is encountered.

An alternative device is disclosed in British Pat. No. 343,794. Advantages of this system over a simple ratchet are that engagement is effected between relatively robust pins and teeth, the pins moving radially of the ring of teeth so that they have less tendency to bounce out of engagement than if the pins were pivotted. Another major advantage of this system is that when one of the members is rotating at high speed relative to the other the pins are disengaged from the teeth by centrifugal force so that there is no friction therebetween to cause wear or generate heat.

However the apparatus disclosed in British Pat. No. 343,794 has the drawback that if the springs urging the pins radially inwardly are strong enough to guarantee engagement between the pins and teeth when required they will not readily be overcome by centrifugal force, losing the advantage of frictionless operation at high speed. Alternatively if the springs are weak enough to ensure disengagement of the pins from the teeth by centrifugal force they may not be strong enough to ensure radially inward displacement of the pins when they are required to engage the teeth and there may have to be some reliance on the effect of gravity on the pins in an upper part of the apparatus to assist the springs. There is a danger that a pin may be held in the inoperative position by friction in the slot in which it travels, especially if after a period of use the pin becomes a poor fit in its slot or is affected by the ingress of dirt. Failure of any one of the pins to move radially inwardly into engagement with the teeth as soon as the rotating member comes to a halt before counter-rotating will have serious consequences in increasing the "run-back" of the apparatus and of course if all pins fail to move to their operative positions the apparatus will fail altogether. The provision of a reliable anti-reversal device is especially necessary for inclined, heavy duty conveyors such as are used in mining and it will be appreciated that the dust laden atmosphere in such an environment is particularly likely to impede the movement of the pins in their slots if precautions against the ingress of dirt should not be fully effective.

The invention as claimed is intended to remedy these drawbacks. The problem is solved in that the load bearing pins are, as soon as the rotary member being controlled tends to counter-rotate, positively driven to their operative positions between the teeth of the rotary and stationary members by a control ring which is free to rotate with the rotary member in the permitted sense of rotation of the latter but is incapable of counter rotation relative to the stationary member.

The advantages offered by the invention are mainly that the load bearing pins are automatically, positively driven to their operative positions, obtaining reliable, positive operation of the device without reliance on e.g. springs, gravity or centrifugal force for the purpose, although the load bearing pins cause no friction during normal operation of the apparatus controlled by the device. The device of the invention can therefore be of robust construction yet will be relatively unsusceptible to malfunctions caused, e.g. by the ingress of dirt.

Figure 6:
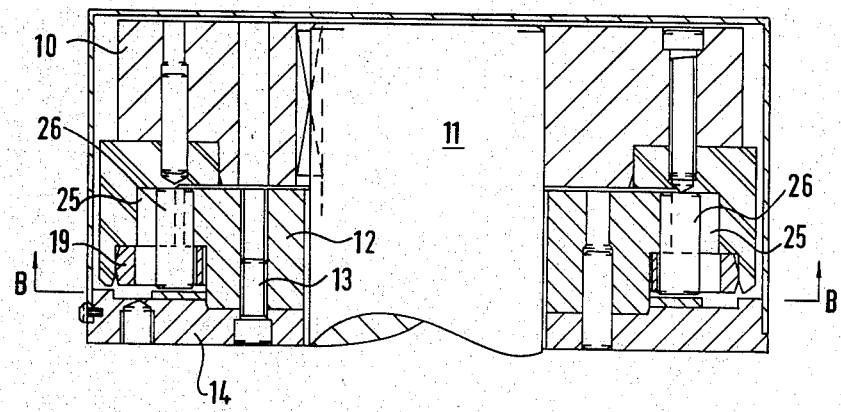

Two ways of carrying out the invention are described in detail below with reference to drawings which illustrate two specific embodiments, in which:

FIG. 1 is a cut-away, perspective view of a first embodiment of an anti-reversal device in accordance with the invention, FIGS. 2, 3 and 4 are similar cross-sectional views through an upper part of the device of FIG. 1 taken on the line A—A of FIG. 1 showing the relationship of the parts during different stages of operation of the device, FIG. 5 is a sectional elevation taken on the line B—B of FIG. 6 of a second embodiment of an anti-reversal device in accordance with the invention, and FIG. 6 is a cross-sectional view of the anti-reversal device of FIG. 5.

The anti-reversal device illustrated in FIGS. 1-4 comprises an annular member or wheel 10 keyed to a shaft 11 and surrounding a member 12 fixed by bolts 13 to a flange 14 which can in turn be secured by bolts 15 to a stationary part of the apparatus (not shown). The member 10 is rotatable with the shaft 11 relative to the stationary member 12 and flange 14 in the permitted direction indicated by the arrow B, the device serving to prevent counter-rotation in the direction indicated by the arrow C.

The members 10 and 12 have concentric rings of teeth 16 and 17, respectively, the teeth of the inner ring 17 being saw-toothed shaped with their steeper sides presented in the direction B of permitted rotation of the member 10 and the teeth of the ring 16 being separated by relatively deep recesses 18 in the inner periphery of the member 10.

Adjacent one axial end face of the member 10 and housed therein so as to be freely relatively rotatable is a control ring 19 which surrounds a secondary ring 20 of saw-toothed shaped teeth integral with the member 12, the steeper sides of the teeth of the ring 20 being presented in the same circumferential direction as the steeper sides of the main ring of teeth 17 of the member 12 and the teeth 20 being so pitched relative to the teeth 17 that in the locked positions of the pins 24 and 26, as will be described, there is an equal angular interval between each pin 24 and the two pins 26 between which it lies. The inner periphery of the control ring 19 is formed with recesses 21 corresponding in number and circumferential spacing with the teeth of the secondary ring 20, each recess 21 being bounded on one side by a substantially radial abutment surface 22 and on its other side by a ramp surface 23 which tapers toward the secondary ring of teeth 20 on the member 12 obliquely with respect to the radial. In each recess 21 a secondary pin 24 is located. The effect of this arrangement is that when the control ring commences rotation in the permitted direction B the abutment surfaces 22 push the pins 24 in sequence over the shallower sides of the stationary teeth 20 until, under the influence of centrifugal force, the pins 24 move far enough into the recesses 22 to clear the teeth 20 (FIG. 2). As the control ring 19 slows to a halt pins 24 above the ring of teeth 20 will drop onto it and if the control ring 19 begins to counter-rotate in the direction C (FIG. 3) the pins 24 will locate against the steeper sides of the teeth 20 and will be engaged between them and the ramp surfaces 22 of the control ring to arrest counter rotation of the latter. Means is thus provided whereby the control ring 19 can rotate in the permitted direction B in a substantially frictionless manner but is arrested as soon as it tends to counter-rotate in the direction C. When the control ring halts and begins to counter-rotate pins 24 above the upper part of the ring will drop from their recesses 21, bringing them to the engaged or locked positions.

The control ring 19 is formed with elongated slots 25 corresponding in number and circumferential spacing with the teeth 16 of the member 10 and the teeth 17 of the member 12. The slots 25 are similarly directed obliquely with respect to the radial and located in each is a pin 26 which extends therefrom between the two rings of teeth 16 and 17. When the member 10 is rotating with the shaft 11 in the permitted direction B the pins 26 are positively driven into inoperative positions within the recesses 18 clear of the teeth 17 on the relatively stationary member 12. Firstly the pins 26 travel up the shallower sides of the teeth 17 to an intermediate position (FIG. 3) and thereafter the tendency of the control ring 19 to lag behind the member 10 drives the pins 26 to their inoperative positions (FIG. 2) clear of the teeth 17. In this position the pins 26 are at the radially outer ends of the slots 25 and the control ring 19 is caused to rotate with the member 10. It will be apparent that when the member 10 is rotating at high speed centrifugal force will assist in moving the pins 26 to their inoperative positions and holding them there, but it is among the advantages of the device of the invention that there is no dependence upon centrifugal force for this purpose.

When, as previously described, the member 10 comes to a halt and begins to counter-rotate in the direction C the control ring 19 is carried with it until engagement of the secondary pins 24 between surfaces 22 and the steeper sides of teeth 20 arrests counter-rotation of the control ring 19, whereupon any continued tendency of the member 10 to counter-rotate in the direction C relative to the arrested control ring 19 will cause the teeth 16 of the member 10 to drive the pins 26 down the slots 25 in the arrested control ring 19 so that the pins 26 are positively driven to their operative positions at the radially inner ends of the slots 25 (FIG. 4). In this position each pin 26 will be interposed, in the circumferential direction, between a tooth of the ring 16 on the member 10 and the steeper side of one of the teeth of the ring 17 on the member 12 firmly locking the member 10 against counter-rotation in the direction C relative to the member 12.

It will be seen that in the operative positions of the pins 26 as illustrated in FIG. 4 the load of the member 10 tending to counter-rotate in the direction C is borne directly by the teeth 17 of the member 12 via the pins 26 and reliance is not placed, for this purpose, on the relatively shallow teeth 20 of the secondary ring on the member 12 serving to arrest the control ring 19.

If, from the position shown in FIG. 4, the member 10 is again rotated in the permitted direction B the control ring 19 is released by the pins 24 moving into the recesses 21 and the main pins 26 travel up the shallower sides of the main teeth 17 of the member 12 in the direction of their inoperative position (FIG. 3). The control ring 19 is carried with the member 10 by the main pins 26 and the pins 26 move to their inoperative position shown in FIG. 2 as previously described.

The embodiment of the invention shown in FIGS. 5 and 6 differs from that shown in FIGS. 1-4 in that the secondary ring of teeth 20 on the stationary member 12, the recesses 21 in the inner periphery of the control ring 19 and the secondary pins 24 are omitted. Other components of this embodiment which are identical to corresponding components of the first embodiment have like reference numerals. The function of the secondary ring of teeth 20 of the first embodiment is performed in the second embodiment by the main ring of teeth 17 on the stationary member 12, the function of the recesses 21 is performed by the teeth 16 of the rotary member and the function of the secondary pins 24 is performed by pins 26A identical to the main, load-bearing pins 26 and interposed therebetween in a sufficient number to ensure that at whatever angular position the rotary member 10 becomes stationary at least one of the pins 26A (the pin 26A' in FIG. 5) will be sufficiently vertically above the axis of the shaft 11 to ensure that it will drop under gravity from the radially outer end of the associated recess between the teeth 16 in the rotary member 10 onto the stationary member 12 where, on counter-rotation of the member 10 in the direction C, it will immediately engage the steeper side of one of the teeth 17 and prevent continued rotation of the control ring 19 in the direction C by abutting the left-hand side (as viewed in FIG. 5) of the associated slot 25A in the control ring 19. The tendency of the member 10 to continue to rotate in the direction C after the control ring 19 has thus been arrested will produce a limited relative angular movement of the member 10 and control ring 19 which will cause the teeth 16 positively to drive the pins 26 from their inoperative positions at the radially outer ends of the slots 25 in the control ring 19 to the operative positions in which they are shown in FIG. 5, travelling radially inwardly of the slots 25 of the control ring 19 under the camming action of the left-hand sides (as viewed in FIG. 5) of the teeth 16 of the rotary member 10. In this position the pins 26, as well as the pins 26A, prevent rotation of the rotary member 10 relative to the stationary member 12 by engagement between the teeth 16 and 17.

When rotation of the member 10 is recommenced in the permitted direction B all the pins 26 and 26A will ride up the shallower sides of the teeth 17, and the tendency of the control ring 19 to lag behind the rotary member 10 will cause the left-hand sides, as viewed in FIG. 5, of the teeth 16 by a camming action positively to drive the pins 26 to their inoperative positions at the radially outer ends of the slots 25 of the control ring 19. Meanwhile the pins 26A will continue to ride over the teeth 17 until lifted clear of them by centrifugal force, the pins 26A occupying the radially outer ends of the recesses between the associated teeth 16 in the rotary member 10 and of the slots 25A in the control ring, so that the device functions in a frictionless manner so far as the pins 26 and 26A are concerned.

There is thus provided a device in which the main, load-carrying pins 26 are positively urged to their operative position in response to any tendency of the member 10 to counter-rotate. Nevertheless, when the member 10 is rotating in the permitted direction the main pins 26 clear the teeth 17 and the secondary pins 24 or 26A clear the teeth 20 or 17 so that the device runs in a substantially frictionless manner. The load-bearing pins 26 are positively urged between their inoperative and operative positions by the control ring 19 which does not itself participate in preventing counter-rotation of the member 10.

Having now described my invention, what I claim is:

1. A device for preventing rotation in one direction of a rotating element comprising:
   a rotary member having teeth connected to rotate with said element;
   a stationary member relatively stationary with respect to said rotary member adjacent said rotary member having first and second concentric sets of teeth radially directed toward said rotary member teeth;
   a main set of locking elements disposed between teeth along said rotary member, said locking elements being displaceable in a direction for engaging said first set of teeth and said rotary member teeth;
   an auxiliary set of locking elements displaceable into and out of engagement with said second ring of teeth;
   a control element rotatable with respect to said rotary member, said control element having means for maintaining said main set of locking elements out of engagement with said first ring of teeth and means for displacing said set of auxiliary locking elements out of engagement with said second ring of teeth when said control element rotates in a direction opposite said one direction; and
   means for displacing said auxiliary set of locking elements into engagement with said second ring of teeth and said control element when said control element rotates in said one direction, and means for displacing said main set of locking elements into communication with said stationary member first set of teeth in response to engagement of said auxiliary locking elements due to rotation of said control element in said one direction whereby any initial rotation of said control member in said one direction results in engagement of said rotary member, control member, stationary member, and sets of locking elements stopping rotation of said rotary member.

2. A device for preventing counter-rotation between two members having concentric rings of main teeth, main locking elements freely movably located between the rings of main teeth, a control element engaging the main locking elements in such a way that a degree of relative rotation between the control element and one of said members permitted by said main locking elements will positively drive the main locking elements between an operative position interposed between said rings of main teeth and an inoperative position clear of one of said rings of main teeth, and means for preventing counter-rotation between said control element and the other of said members, wherein said means for preventing counter-rotation between said control element and said other member comprises auxiliary locking elements freely movably located between concentric rings of teeth of the control element and said other member, or between concentric rings of teeth of said members, the auxiliary locking elements being movable to inoperative positions clear of the teeth of one of said rings under the influence of centrifugal force so that relative rotation of said members can occur in a substantially frictionless manner and the arrangement being such that arrest of the control element or its counter-rotation relative to said other member will cause interposition of said auxiliary locking elements between said concentric rings of teeth whereupon counter-rotation of said one member relative to the arrested control element will cause the latter positively to displace the main locking elements to their operative positions.

3. A device as claimed in claim 2 in which the control element engages the main locking elements with a camming action.

4. A device as claimed in claim 3 in which the control element is a control ring concentric with said rings of teeth.

5. A device as claimed in claim 4, in which each main locking element is engaged in a respective, elongated slot in the control ring which is disposed therein obliquely with respect to the radial direction.

6. A device as claimed in claim 5, in which the series of oblique slots in the control ring is interrupted by slots of a different configuration such that when all the locking elements are in their inoperative positions at the radially outer ends of the teeth of the radially outer concentric ring of teeth an auxiliary locking element in one of said slots of different configuration above the axis of relative rotation of said members can, when freed from centrifugal force, fall under the influence of gravity onto said radially inner one of said concentric rings of teeth so as to render said control element non-counter rotatable relative to said stationary member in said one direction.

7. A device as claimed in claim 6, in which said slots of a different configuration are distributed around the control ring at angular intervals of less than 90°.

8. A device as claimed in claim 5, in which the control ring is rotatable in a direction opposite said one direction only relative to said stationary member through the provision of a secondary ring of teeth of ratchet-like form extending circumferentially around said stationary member concentrically with respect to said first-mentioned ring of teeth thereon.

9. A device as claimed in claim 8 in which the control ring co-operates with said secondary ring of ratchet teeth by means of a secondary ring on the inner circumference of the control ring and pins comprising said auxiliary elements located between said secondary ring of teeth and said secondary ring of ratchet teeth, the teeth of said secondary ring being so shaped that said pins may ride over the shallower sides of the secondary ring of ratchet teeth but will locate between the steeper sides of said secondary ring of ratchet teeth and the teeth of the secondary ring if the control ring tends to counter rotate relative to said stationary member.

10. A device as claimed in claim 9 in which the teeth on the inner circumference of the control ring are deep enough to permit entry of the pins clear of the secondary ratchet teeth under the influence of centrifugal force so that the control ring can rotate in said direction opposite said one direction without friction between said pins and said secondary ratchet teeth.

11. An anti-reversal device comprising:
a rotary member;
a stationary member, relatively stationary with respect to said rotary member, each of said members having concentric rings of main ratchet teeth, said stationary member having a second inner set of concentric teeth;
main locking elements interposable between the sides of said ratchet teeth of both said members to prevent counter-rotation between said members when said main locking elements are in operative positions, said elements being displaceable to inoperative positions clear of the teeth of one of said members to permit substantially frictionless rotation of said rotary member relative to said stationary member in a permitted sense;
a control element mounted to have limited angular movement relative to said rotary member engaging said main locking elements positively to displace said elements to an operative position during counter-rotation and to an inoperative position during rotation of said control element in a permitted sense; and
auxiliary locking elements captive between teeth located on the control element and said second set of teeth of said stationary member, said auxiliary locking elements being displaceable to inoperative positions by centrifugal force generated during rotation of said rotary member in the permitted sense of rotation of the rotary member, at least one of said auxiliary locking elements being released by said teeth located on the control element into said operative position engaging said stationary member second set of teeth during counter-rotation of said control element, whereby said auxiliary element, the second set of teeth of said stationary member, and the control element are engaged preventing rotation of said control element and said control element member displaces said main locking elements to an operative position engaging said stationary member teeth and said rotary member teeth stopping rotation of said rotary member.

12. The anti-reversal device of claim 11, wherein said control element slots extend obliquely radially outward in a direction counter to said permitted sense of rotation from said second set of teeth on said stationary member at a distance from said teeth sufficient to permit said auxiliary elements to slide by centrifugal force during rotation in a permitted sense clear of said inner set of teeth, said slot having edges which terminate adjacent to said second set of teeth at a distance sufficient to maintain said auxiliary elements in said slots.

13. The anti-reversal device of claim 12, wherein the leading edge of said slots in said permitted sense of rotation provides a camming surface for forcing said auxiliary elements during counter-rotation of said control element against a surface of said inner teeth and said camming surface whereby said auxiliary elements are held inhibiting further counter-rotation of said control element.

14. The anti-reversal device of claim 13, wherein each of said inner teeth comprise first and second ramp surfaces which converge towards the center of said second set of teeth, one of said ramps extending in said direction of counter-rotation forming said surface for holding said auxiliary element in cooperation with said control ring teeth during counter-rotation of said control ring.

15. A device for preventing rotation in one direction of a rotating element comprising:
a rotary member connected to rotate with said element having a plurality of teeth;
a stationary member adjacent to said rotary member and relatively stationary thereto, said stationary member having first and second concentric sets of teeth, said sets of teeth having a ramp portion increasing in height in a direction opposite said one direction;
a first set of displaceable pins located between teeth on said rotary member, said pins being displaceable from a first position engaging said stationary member first set of teeth to a second non-engaging position between said rotary member teeth;
a second set of displaceable pins located in a position for being displaceable into and out of engagement with said second set of teeth; and
a control member rotatable with respect to said rotary member, said control member having an obliquely extending slot over each pin of said first set of pins for guiding said pins into said first set of teeth, and a ring of recesses forming a plurality of cams, each providing a surface for moving said second set of pins away from said second ring of teeth during rotation of said element in said opposite direction, said rotary member and control member rotating together in said opposite direction, and when said rotary member moves in said one direction said second set of pins are cammed by said recesses to engage said second set of teeth along said ramp portion with a portion of said control element prohibiting movement of said element, whereby said control element slots guide said first set of pins being forced by said rotary member teeth into engagement with said first ring of teeth stopping rotation of said rotary member.

* * * * *